UNITED STATES PATENT OFFICE.

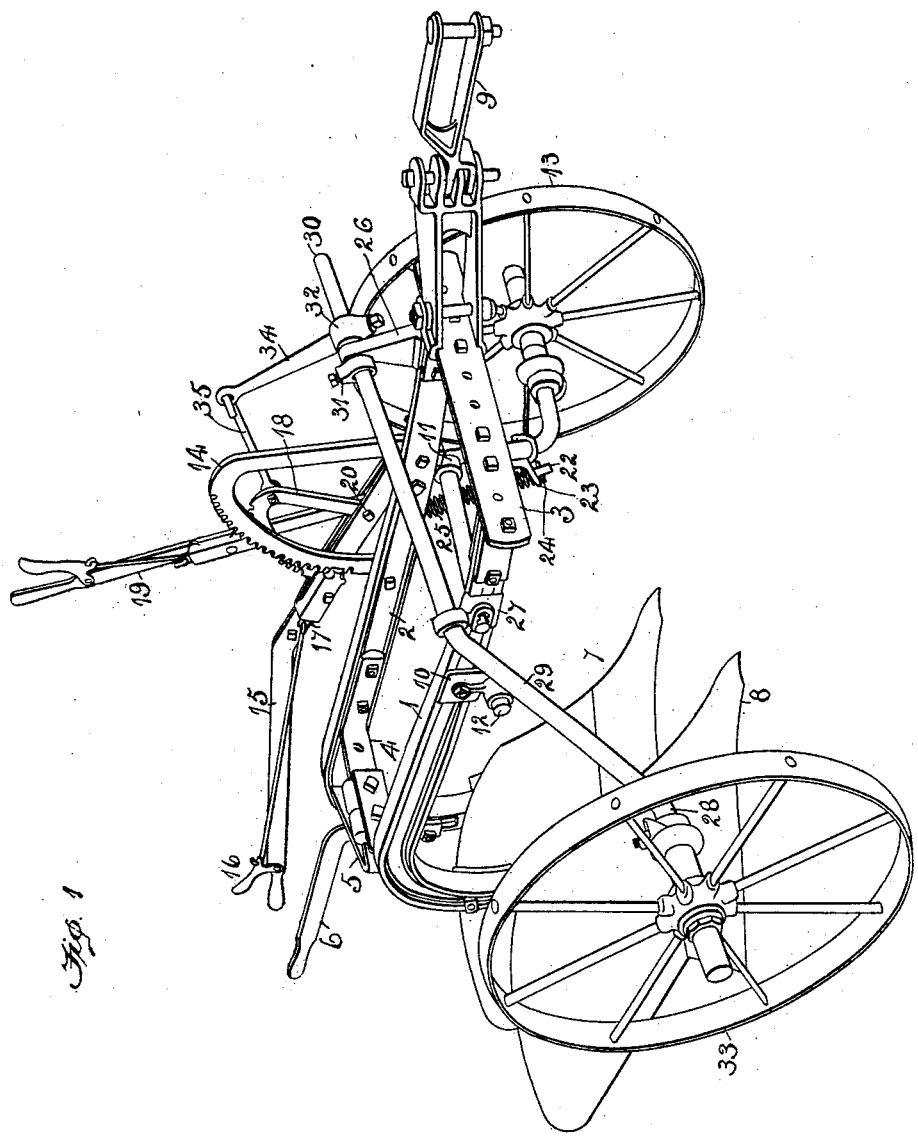

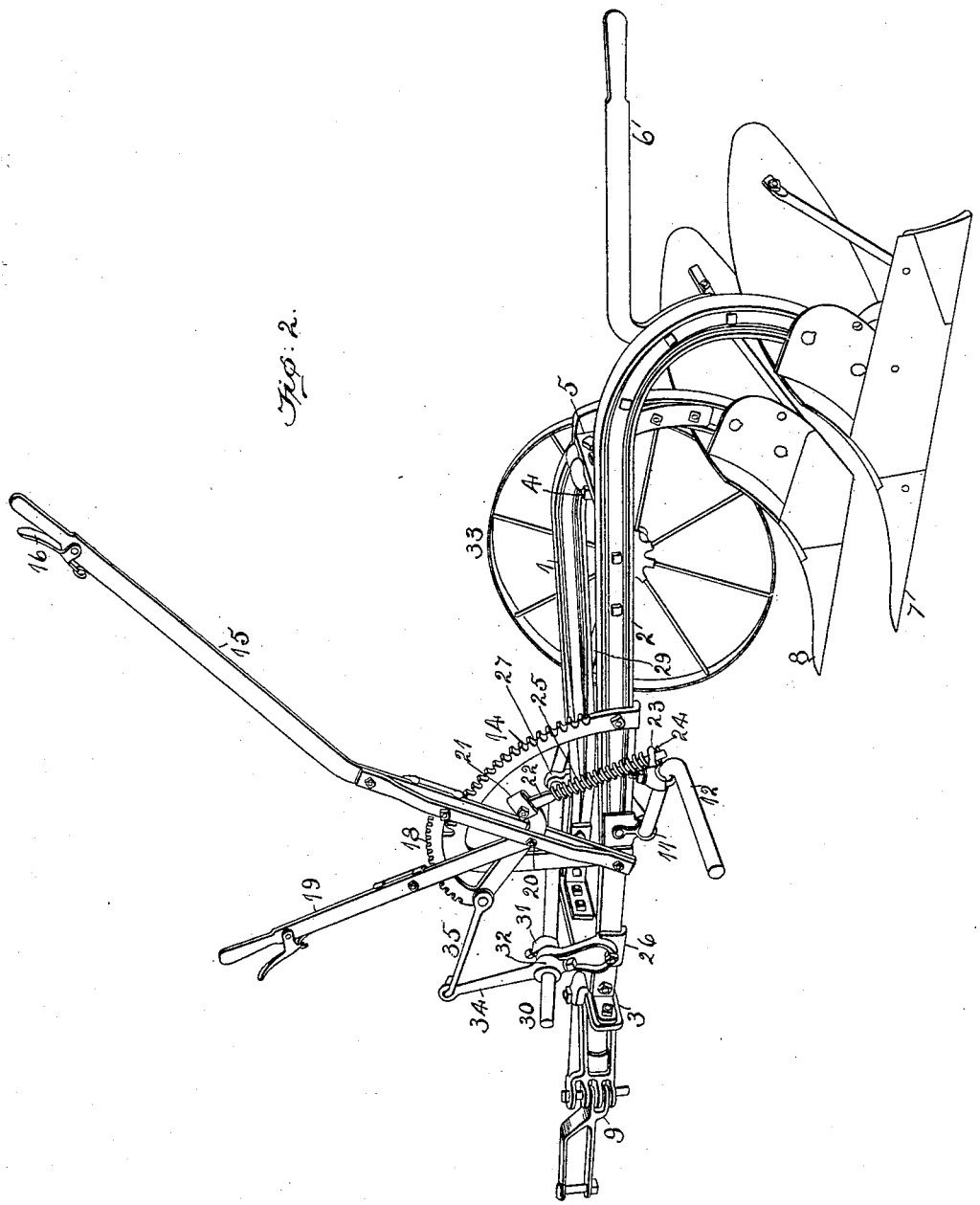

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

WHEELED PLOW.

No. 930,249.  Specification of Letters Patent.  Patented Aug. 3, 1909.

Application filed January 7, 1908. Serial No. 409,687.

*To all whom it may concern:*

Be it known that I, LEWIS E. WATERMAN, a citizen of the United States, residing at Rockford, in the county of Winnebago and State of Illinois, have invented certain new and useful Improvements in Wheeled Plows, of which the following is a specification.

The object of this invention is to simultaneously raise and lower the forward portion of the frame and straighten and stagger the furrow wheel.

In the accompanying drawings. Figure 1 is a perspective view of my improved plow as seen from the front and in which the points of the plows are elevated and the furrow wheel righted. Fig. 2 is a perspective view of the plow as seen from the rear and in which the plows are in working position and the furrow wheel is staggered.

The plow beams 1 and 2 are connected at their forward ends by the cross-bar 3, and their rear portions are connected by the braces 4 and 5. To the rear portion of the plow beam 2 is connected a hand lever 6. To the plow beam 2 is connected a plow 7, and to the plow beam 1 is connected a plow 8. A clevis 9 is connected to the cross-bar 3. To the plow beam 1 is secured a bracket 10 and to the plow beam 2 is secured a bracket 11. An axle 12 to which is connected a land-wheel 13, is supported by the brackets 10 and 11, in a manner to oscillate therein. To the plow beam 2 is secured a toothed-segment 14 and a hand-lever 15 is pivotally supported by the plow-beam 2. This hand-lever 15 is provided with the usual thumb-latch 16 and dog 17 engagement with the toothed-segment 14. To the hand-lever 15 is fixedly connected a toothed segment 18, which extends therefrom. A hand-lever 19 has a pivotal connection with the hand-lever 15 at the point 20 and is provided with the usual thumb-lever and dog engagement with the toothed-segment 18. This hand-lever 19 has an extension 21 to which is pivoted a rod 22. This rod 22 extends through an eye 23 secured to the axle 12 of the land-wheel, and a pin 24 passes through the rod outside of the eye 23. A spring 25 surrounds the rod, and bears against the eye 23. To the plow-beam 1 is secured a bracket 26 and to the plow-beam 2 is secured a bracket 27.

An axle for the furrow-wheel 33 comprises the three sections 28, 29 and 30. The section 30 is located in the brackets 26 and 27 and is held against lengthwise movement by the collars 31 and 32, one located each side of the bracket 26 and secured to the axle. The furrow-wheel 33 is mounted on the section 28 of the axle. The section 29 of the axle connects the sections 28 and 30 thereof and extends diagonally downward. From the collar 32 extends an arm 34, and a link 35 connects this arm with the toothed segment 18. The bracket 26 extends farther above the plow-beam 2 than the bracket 27 above the plow-beam 1, and is located nearer the cross-bar 3. This arrangement of the brackets supports the section 30 of the furrow-wheel axle, diagonally both to a horizontal and to a vertical plane.

The plow points are elevated which will allow the heel of the plow 7 to drag on the ground. When the points of the plows are elevated, the wheels 13 and 23 stand in substantially a vertical plane in which position the plows are transported over the field. By means of the hand-lever 6 the plow as a whole may be turned.

In placing the plows in working position, by moving the hand-lever 15 forward, the axle for the land-wheel and the axle for the furrow-wheel are rocked, which will lower the forward ends of the plow-beams and stagger the furrow-wheel. By means of the hand-lever 19 the land-wheel axle can be rocked independent of the furrow-wheel axle thereby adjusting the height of the land-side of the plow proper. The spring 25 permits the land-wheel to pass over obstructions without materially changing the level of the plow-beams.

I claim as my invention.

1. The combination of a frame, a plow fixedly connected to the frame, a land wheel, a furrow wheel, and means for simultaneously raising the forward portion of the frame thereby raising the front portion of the plow and straightening the furrow wheel into substantially a vertical position.

2. The combination of a frame, a plow fixedly connected to the frame, a land wheel, a furrow wheel, and a lever for simultaneously raising the forward portion of the frame thereby raising the point of the plow and straightening the furrow wheel into substantially a vertical position.

3. The combination of a frame, a plow fixedly connected to the frame, a land wheel, a furrow wheel, means for simultaneously raising the forward portion of the frame thereby raising the point of the plow and straightening the furrow wheel into substantially a vertical position, and means for holding the parts in their adjusted positions.

4. The combination of a frame, a plow supported by the frame, a furrow wheel axle having a portion extending across the frame and located diagonally to the vertical and horizontal planes of the frame, a furrow wheel connected to the axle, and a lever for oscillating the diagonal portion of the axle.

5. The combination of a frame, a plow supported by the frame, a toothed segment, a hand lever for the toothed segment, a second toothed-segment fixedly connected to the hand-lever, a second hand-lever for the second-segment, a land wheel axle, a land wheel for the axle, a link connection between the land-wheel axle and the second hand-lever, a furrow-wheel axle independent of the land-wheel axle, a furrow-wheel connected to the axle, and a connection between the furrow-wheel axle and the second-toothed-segment.

6. The combination of a frame, a plow supported by the frame, a toothed segment connected to the frame, a hand-lever for the toothed-segment, a second-toothed segment fixedly connected to the hand-lever, a second-hand lever for the second segment, a land wheel axle, a land-wheel for the axle, a spring connection between the land-wheel axle and the second hand-lever, a furrow-wheel axle independent of the land-wheel axle, a furrow-wheel connected to the axle, and a connection between the furrow-wheel and the second toothed segment.

7. The combination of a frame, a plow supported by the frame, a furrow wheel axle having a portion extending across the frame and located diagonally to the vertical and horizontal planes of the frame, a furrow wheel connected to the axle, a hand lever for oscillating the diagonal portion of the axle, a land wheel axle, a land wheel supported by its axle, and a connection between the lever for oscillating the diagonal portion of the axle and the lever for the land wheel axle.

In testimony whereof I have hereunto set my hand in presence of two subscribing witnesses.

LEWIS E. WATERMAN.

Witnesses:
A. O. BEHEL,
E. D. E. N. BEHEL.